United States Patent
Piikivi

(10) Patent No.: US 7,299,983 B2
(45) Date of Patent: *Nov. 27, 2007

(54) WIRELESS COMMUNICATION DEVICE PROVIDING A CONTACTLESS INTERFACE FOR A SMART CARD READER

(75) Inventor: Lauri Piikivi, Oulu (FI)

(73) Assignee: Nokia Corporation, Espoo (FI)

( * ) Notice: Subject to any disclaimer, the term of this patent is extended or adjusted under 35 U.S.C. 154(b) by 380 days.

This patent is subject to a terminal disclaimer.

(21) Appl. No.: 10/528,258

(22) PCT Filed: Sep. 17, 2003

(86) PCT No.: PCT/IB03/04000

§ 371 (c)(1),
(2), (4) Date: Mar. 17, 2005

(87) PCT Pub. No.: WO2004/029860

PCT Pub. Date: Apr. 8, 2004

(65) Prior Publication Data

US 2006/0049258 A1 Mar. 9, 2006

Related U.S. Application Data

(63) Continuation-in-part of application No. 10/259,813, filed on Sep. 27, 2002, now Pat. No. 6,776,339.

(51) Int. Cl.
*G06K 7/08* (2006.01)
(52) U.S. Cl. .................. 235/451; 235/492; 235/380; 235/375; 340/5.61; 340/5.74
(58) Field of Classification Search ............... 235/375, 235/376, 380, 441, 451, 492; 340/5.61, 5.65, 340/5.74
See application file for complete search history.

(56) References Cited

U.S. PATENT DOCUMENTS

| 5,796,832 | A | 8/1998 | Kawan |
| 5,929,414 | A | 7/1999 | Saitoh |
| 6,138,918 | A | 10/2000 | Tarbouriech |
| 6,237,849 | B1 | 5/2001 | Cooper et al. |
| 6,250,557 | B1 | 6/2001 | Forslund et al. |

(Continued)

OTHER PUBLICATIONS

International Standard ISO/IEC 7816-4; First Edition Sep. 1, 1995; *Information technology—Identification cards—Integrated circuit(s) cards with contacts—Part 4: Interindustry commands for interchange*; Sep. 1, 1995.

(Continued)

*Primary Examiner*—Steven S. Paik
(74) *Attorney, Agent, or Firm*—Ware, Fressola, Van Der Sluys & Adolphson LLP

(57) ABSTRACT

A wireless terminal (30) including a smart card application host (34), such as a contact smart card or the terminal MCU or a terminal security component, and including a terminal interface (32), and also including a smart card router (33) that enables RF communication with a contactless card reader (35) in for example a ticketing system (31), even though the smart card application host (34) does not contain a contactless interface. The smart card router (33) includes an RF antenna (33c), separate from and external to the smart card application host (34), and also a modulator/demodulator (33b), and also includes a card access module and router (33a) for routing communication traffic ($R_{in}$) arriving via the RF antenna (33c) to either the smart card application host (34) or to the terminal interface (32), based on information included in the arriving communication traffic ($R_{in}$).

15 Claims, 3 Drawing Sheets

U.S. PATENT DOCUMENTS 6,256,690 B1     7/2001     Carper
6,577,229 B1     6/2003     Bonneau et al.

OTHER PUBLICATIONS

British Standard ISO/IEC 14443-1:2000; *Identification cards—Contactless integrated circuit(s) cards—Proximity cards—Part 1: Physical characteristics*; Feb. 18, 2002.

British Standard ISO/IEC 14443-2:2001; *Identification cards—Contactless integrated circuit(s) cards—Proximity cards—Part 2: Radio frequency power and signal interface*; Feb. 18, 2002.

British Standard ISO/IEC 14443-3:2001; *Identification cards—Contactless integrated circuit(s) cards—Proximity cards—Part 3: Initialization and anticollision*; Feb. 18, 2002.

British Standard ISO/IEC 14443-4:2001; *Identification cards—Contactless integrated circuit(s) cards—Proximity cards—Part 4: Transmission protocol*; Feb. 18, 2002.

WIRELESS COMMUNICATION DEVICE PROVIDING A CONTACTLESS INTERFACE FOR A SMART CARD READER

This application is a 371 of PCT/IB03/04000 filed Sep. 17, 2003 which is a CIP of 10/259,813 filed Sep. 27, 2002 now a U.S. Pat. Ser. No. 6,776,339.

FIELD OF THE INVENTION

The present invention pertains to wireless communication, and more particularly to the use of smart cards and security components and security chips in wireless communication devices.

BACKGROUND OF THE INVENTION

A smart card is a memory and/or microprocessor chip embedded in a plastic card for easy carrying and usage, most commonly as a smart card based payment card (such as a Eurocard-Mastercard-Visa (EMV) card or a so-called e-purse) or as a subscriber identity module (SIM) card in wireless terminals, such as in the Global System for Mobile Communications (GSM). A microprocessor chip of a smart card also often contains advanced security features that protect the data in the memory. Smart cards with only memory are called memory cards; smart cards with a microprocessor chip and memory are called microprocessor cards. A memory card stores data but cannot manipulate the data, and can be considered similar to a floppy disk, except that such a card also includes security features such as authenticated access to memory and copy protection of memory contents against unauthorized access. A microprocessor card can add, delete, and otherwise manipulate information in a memory on the card, and is like a miniature computer, having an input and output port, an operating system, and persistent memory (such as a hard disk or other non-volatile memory device), but with built-in security features. Microprocessor card functionality is defined by and can be changed with software applications that are installed to card.

Smart cards have two different types of interfaces: contact interfaces and contactless interfaces, otherwise known as radiofrequency (RF) interfaces. A contact smart card must be inserted into a contact card reader to interface with other systems. For example, a smart card can hold in memory either an indication of funds from which a ticket can be purchased from a ticketing system, or can hold in memory an indication of a number of tickets already paid for and not yet used, in which case the smart card interfaces with the ticketing system to use a ticket. In either case, the ticketing system would read the memory of the smart card to determine the current balance (of either funds or tickets not already used), subtract either the price of a ticket or reduce the number of tickets by one, and write the new balance to the memory.

When using a contact smart card, the contact card reader (of for example a ticketing system) makes contact with electrical connectors on the card (leading to the chip) and via the connectors, transfers data to and from the chip (memory on the chip). Contactless smart cards are passed near a contactless card reader, having an antenna and RF module on the card, in order to carry out a transaction (such as using a ticket as above). Contactless cards are preferable in cases where transactions must be processed quickly, as in mass transit or toll collection, or where the reader needs high availability as RF reading does not wear out electrical contacts or mechanical elements of a reader.

Some cards include only one or another of the two kinds of interfaces, and some, called dual interface cards, include both kinds.

In wireless communications via a cellular communications network, such as provided by the Global System for Mobile Communications (GSM), smart cards called SIM (subscriber identity module) cards, which are microprocessor smart cards, provide secure user authentication, secure roaming, and a platform for value-added services. The SIM card (i.e. the microprocessor on the SIM card) can be programmed to carry multiple applications, such as a credit card applications (to allow debits and credits to a credit card account, or a ticketing application, to allow buying tickets). In such a case, the SIM card should act as a contactless (memory or microprocessor) smart card, communicating with for example a ticketing system via RF communications according to ISO (international standards organization) 14443 (as opposed to RF for cellular communications, as for example for communicating with a radio access network of GSM). The activation of new applications can be downloaded to the card over the air, in real time, via the cellular communication network. Some wireless communication devices today also include contact and/or contactless (memory or microprocessor) smart cards that are distinct from the SIM card.

FIGS. 1 and 2 show a prior art mobile terminal 10 including a dual-interface smart card 14 (which may be a SIM, or may be another, distinct smart card) having a contact interface 14a and a contactless interface 14b, and shows the smart card communicating with a ticketing system 11 via its contactless interface (the ticketing system including a contactless card reader 15 and a back end, i.e. the rest of the ticketing system after the card reader), and also communicating with a terminal interface module 12 of the mobile terminal 10 via the contact interface (the terminal interface including a contact card reader 12a). FIG. 2 shows the contact interface 14b of the smart card 14 of FIG. 1 in more detail, and indicates the antenna used to provide the contactless interface 14b. In all the contactless smart cards according to the prior art, an antenna per ISO standard 14443, is embedded in the card, and when such a card is enclosed in a cellular communication device, the antenna must be moved to the outside of the device. ISO standard series 7816-X governs all aspects of the smart card and its contact interface, including (in 7816-4) common format of commands and basic commands and responses to include the application protocol data unit (the command exchange format independent of the transport protocol).

In FIG. 1, the smart card 14 might host a ticketing application (in which case the card is a microprocessor smart card) or might hold only ticket data (so that the card could then be a simple memory card). In case the smart card 14 hosts a ticketing application, in order to purchase a ticket (for example to get on a bus or a subway), the ticketing application interacts with the ticketing system 11 and is authenticated, and then the ticketing application deducts the cost of the ticket from the balance of a ticket account stored in the smart card application. In case of a memory card, the memory holding a ticket account is read by the ticketing system 11 and the ticketing system then re-writes the balance in the ticket account reduced by the cost of the ticket. In either case, since the smart card reader of the ticketing application is a contactless reader, the mobile terminal 10 in which the smart card 14 resides, is waved (swiped) near to the card reader of the ticketing system so as to prompt the card reader and thereby initiate the ticket-purchase (or use) transaction as described above. The smart card 14 might be the SIM card of the mobile terminal 10, or it might be another smart card. The smart card 14 is a dual-interface card, having both a contact interface 14a and a contactless interface 14b, to allow for downloading, via the cellular network and then via the contact interface, new tokens (for purchasing tickets) or other ticket-purchasing funds. In addition, the contact interface can be used to allow a user of the mobile terminal to browse the memory of the smart card, for example to determine the number of tokens left in the ticket account.

The smart card 14 is controlled, via either interface 14a 14b, with so-called APDU (Application Protocol Data Units) commands, defined in ISO standard 7816-4 or defined for the application in separate specifications. (ISO standard 7816-4 defines the common format and some common commands, but there is a separate specification for smart card credit cards that defines a set of commands for such smart cards, and the same is true for GSM SIM smart cards.) RF access to smart cards is defined in multiple ISO standards, but especially ISO standard 14443, mentioned above. Also, the terminology APDU is used here both in the smart card specific sense of ISO standard 7816-4, and also, when used to refer to communication traffic not intended for the smart card, according to other standards. For example, communication traffic destined for the wireless terminal MCU (microcontroller unit) is in the form of APDUs, although not the same APDUs as defined for smart cards, and is nonetheless indicated simply as APDUs in the description that follows.

As also mentioned above, putting a smart card with a contactless interface into a mobile terminal requires moving the antenna for the card to the outside of the mobile terminal (otherwise, the mobile terminal casing will block the RF signals to and from the smart card). When the antenna is taken out of the smart card, the smart card becomes non-standard (i.e. it must be made specially); in addition, the antenna must be tuned to the card chip hardware resistance and impedance, and for different chip models and manufacturers the tuning would be different, making it difficult to use an antenna for a smart card located off-card.

Embedding a dual-interface smart card in a mobile terminal is also problematic in case of transactions requiring user interaction, such as those in which the user must give a PIN to authorize a payment via the smart card, since then the dual interface card must communicate through both interfaces during the same transaction, or the ticketing system must have a separate communication path to the card and to the terminal interface of the mobile terminal. Allowing for communication through both interfaces is complex; at the point when user interaction is needed, the card application must wake up the mobile terminal to show the display text and ask for input, and the wake up requires an interrupt from the card (or else the mobile terminal must ask the card repeatedly whether the card needs any mobile terminal services). Proposals have been made where the ticketing system (instead of the smart card) communicates with the mobile terminal to prompt for a PIN, but these proposals make the ticketing system more complex and expensive.

What is needed is a way to include in a mobile terminal or other wireless terminal (e.g. a personal computer), a smart card, i.e. a memory or microprocessor smart card providing a smart card application (and so in addition to the functionality provided by a SIM card), that does not suffer from the above mentioned difficulties, such as the difficulty in making possible communicating with a user during a transaction involving the smart card, or providing a contactless interface (i.e. an RF antenna per ISO 14443), and ideally a way that allows using a standard smart card (as opposed to a dual-interface smart card with the antenna moved off-card).

SUMMARY OF THE INVENTION

Accordingly, in a first aspect of the invention, a wireless terminal is provided having a terminal interface, characterized in that the wireless terminal includes a smart card application host and also a smart card router, the smart card router responsive to radiofrequency (RF) communication signal issuing from a contactless smart card reader, for demodulating the RF communication signal and providing either a demodulated communication traffic signal routed to the smart card application host or a demodulated communication traffic signal routed to the terminal interface, the routing determined based on information conveyed by the RF communication signal.

In accord with the first aspect of the invention, the smart card application host may be either a contact smart card, a microcontroller residing in the wireless terminal, or a security component of the wireless terminal.

Also in accord with the first aspect of the invention, the smart card router may also be responsive to unmodulated communication traffic provided by the smart card application host and may also be responsive to unmodulated communication traffic provided by the terminal interface, and in response to either may provide a modulated communication traffic signal for transmission to the contactless smart card reader. Further, the smart card router may comprise a card access module and router, a modulator/demodulator, an RF antenna, and a card reader chip, with the card access module and router coupled to the smart card application host via the card reader chip, and coupled to the terminal interface, and also coupled to the RF antenna via the modulator/demodulator, the RF antenna in turn radiatively coupled to the ticketing system.

Still also in accord with the first aspect of the invention, the smart card router provides logical channels for communication with different applications hosted by the smart card application host.

Yet still also in accord with the first aspect of the invention, in starting communications with the contactless smart card reader, the wireless terminal may report RF parameter messages in a format understandable to the contactless smart card reader so as to enable the communications, and further, the RF parameters so reported may indicate proprietary capabilities of the smart card application host. Also further, the RF parameters may be derived from data provided by an answer-to-reset message issued by the smart card application host.

In a second aspect of the invention, a method is provided for use by a wireless terminal in communicating with a contactless smart card reader, the wireless terminal including a smart card application host hosting at least one smart card application, the method characterized by: a step of receiving from the contactless smart card reader an RF communication signal pertinent to the at least one smart card application; a step of examining the received communication signal to determine where to route it, including possibly routing the communication signal to the at least one smart card application or to a terminal interface of the wireless terminal or to an RF antenna for radiative transmission to a system related to the at least one smart card application; and a step of routing the communication signal to the destination so determined.

In accord with the second aspect of the invention, the smart card application host may be either a contact smart card, a microcontroller residing in the wireless terminal, or a security component of the wireless terminal.

Also in accord with the second aspect of the invention, in routing the communication signal, logical channels may be used for communication with different applications hosted by the smart card application host.

Also in accord with the second aspect of the invention, in starting communications with the contactless smart card reader, the wireless terminal may report RF parameter messages in a format understandable to the contactless smart card reader so as to enable the communications. Further, the RF parameters so reported may indicate proprietary capabilities of the smart card application host. Also further, the RF parameters may be derived from data provided by an answer-to-reset message issued by the smart card application host.

With the invention, the antenna and RF circuitry are part of the mobile terminal and thus always tuned, and the smart card is a standard contact card (not a smart card with the antenna of the contactless interface moved off-card). With the arrangement provided by the invention, it is possible to use a SIM card or other, separate smart card distinct from the SIM card, to host smart card applications (or memory associated with applications). Smart cards come from many manufacturers even for a single operator, but as the tuning is not dependent on the card used, the many different kinds of chips and cards that might be used presents no problem.

Another advantage of the invention is that the need for user input can be detected from the message flow between the smart card application and a ticketing system (or other system with a card reader for interacting with the smart card) so that the wireless terminal can automatically ask for the user input (for a PIN for example) and pass the input to the smart card. It is also possible according to the invention for the ticketing system to command the wireless terminal directly (as opposed to having the wireless terminal monitor the communication traffic between the smart card and the ticketing system), and to have the command to the wireless terminal pass along the same RF communications path as communication traffic for the card; no separate RF communication path is needed between the ticketing system and the wireless terminal.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention, a smart card in a mobile terminal adapted to provide a contactless interface for the smart card, will now be described in case of the smart card being distinct from the SIM card of the wireless terminal and providing a single application, buying a ticket from a ticketing system, such as a ticket to board a bus, using funds kept in an account on the smart card. It should be understood however, that the invention is not in any way limited to any particular application, nor is it limited to having an application hosted by a smart card distinct from the SIM card, nor it is limited to a single-application smart card. The invention is of use whenever a smart card application interfacing with a contactless smart card reader (via RF per ISO standard 14443 or other RF standard for smart cards, ISO 15639 or legacy low frequency RF-interfaces and future standards for contactless smart card usage) is to be provided by a wireless terminal. In the description provided here, ISO standard 14443 is used, but other standards might be used just as well.

Figure 1:
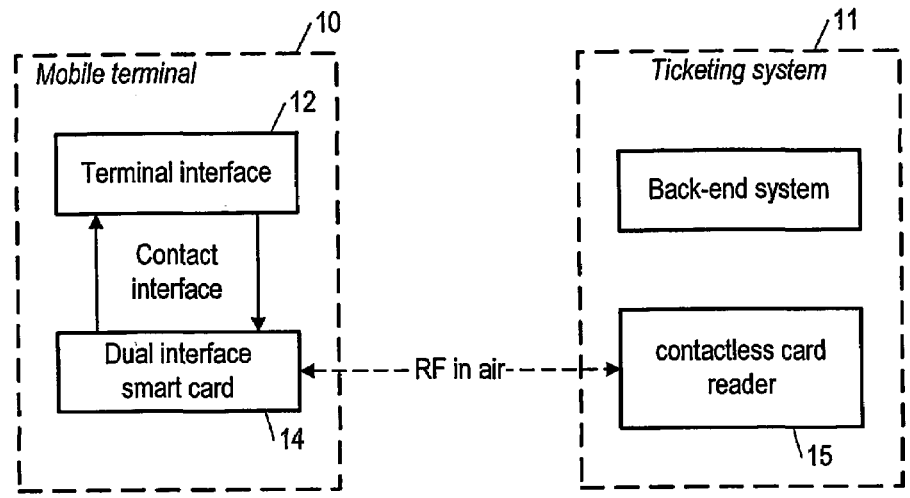
FIG. 1 is a block diagram of a mobile terminal hosting a smart card and having a terminal interface to the smart card, according to the prior art.
Figure 2:
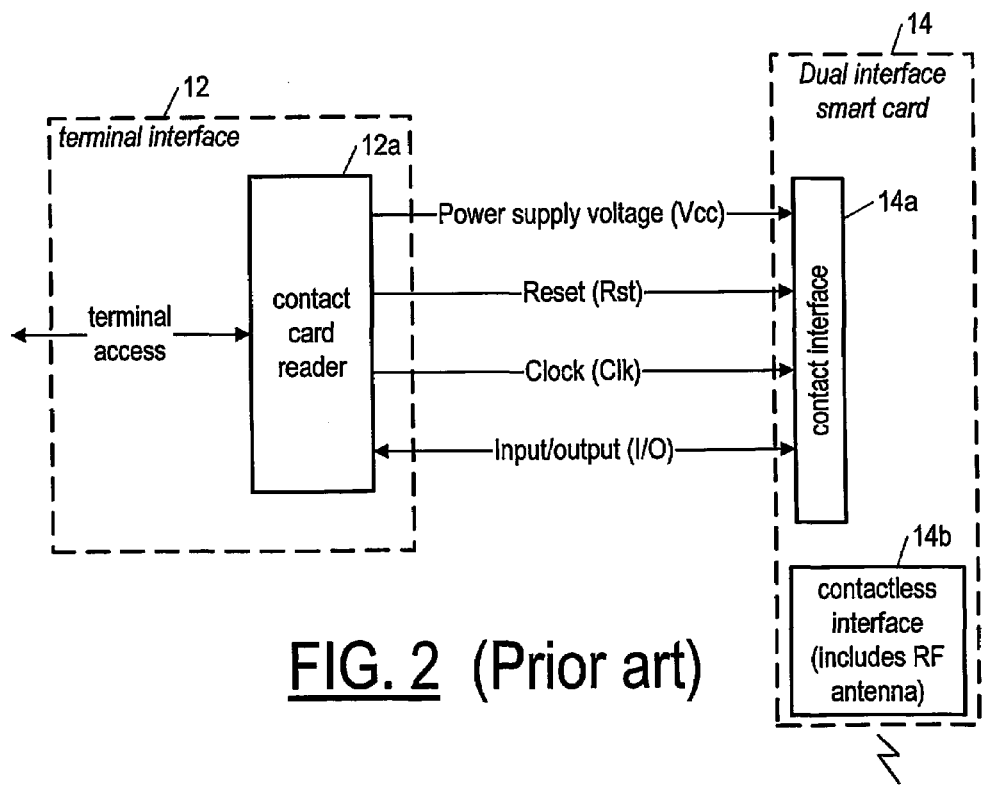
FIG. 2 is a block diagram illustrating in more detail the smart card of FIG. 1 and the terminal interface.
Figure 3:
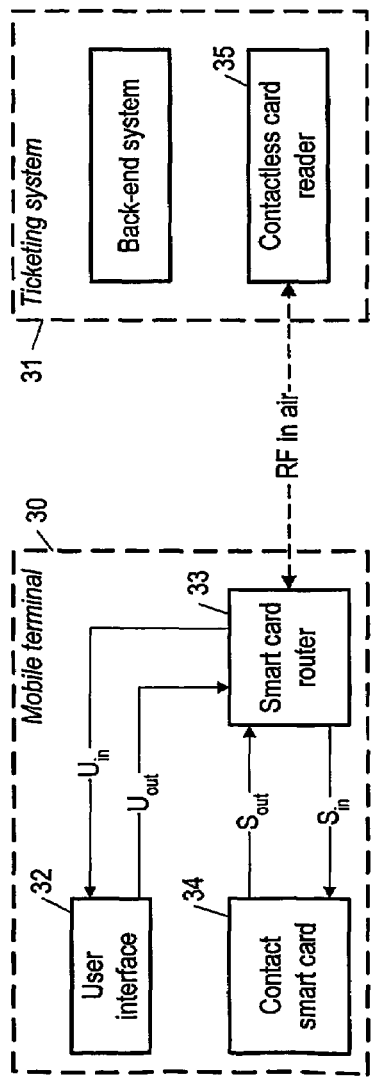
FIG. 3 is a block diagram of a mobile terminal hosting a smart card and having a terminal interface to the smart card, according to the invention.

Referring now to FIG. 3, a mobile terminal 30 (or any kind of wireless terminal, not necessarily mobile) having a terminal interface 32 is adapted according to the invention to include a contact smart card 34 having only a contact interface 34a (FIG. 4) by including in the mobile terminal a smart card router 33, which simulates a contactless interface to the contact smart card. With the smart card router, the mobile terminal 30 is able to be used to, for example, purchase a ticket (a ticket for example for a bus ride) from a ticketing system 31 (hosted for example by a processor onboard the bus) by communicating with the ticketing system via a standard contactless card reader 35 provided as part of the ticketing system. The same exact ticketing system 31 would interface with a standard contactless smart card in the exact same way as it interfaces with the mobile terminal 30, i.e. the contactless interface simulated by the mobile terminal makes the mobile terminal 30 appear to the standard contactless card reader 35 of the ticketing system 31 to be a standard contactless smart card.

Figure 4:
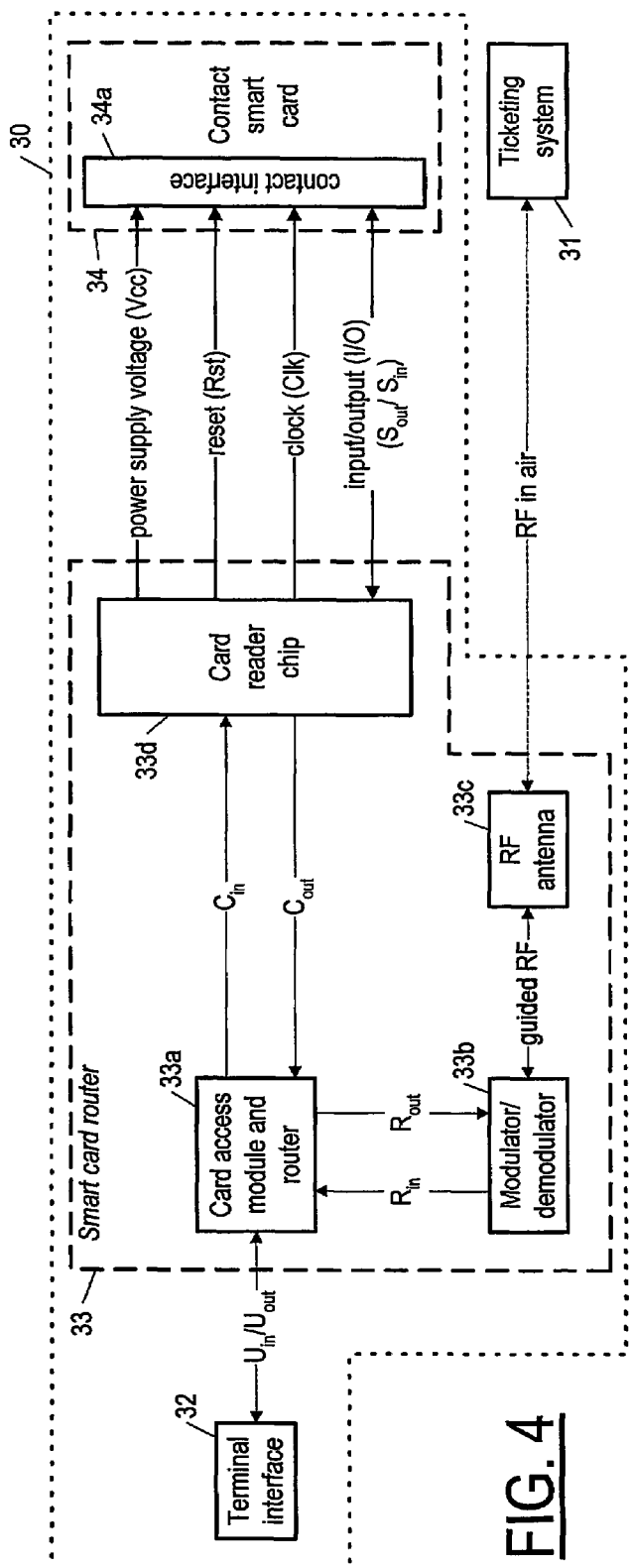
FIG. 4 is a block diagram illustrating in more detail the smart card of FIG. 2 and the terminal interface.

Referring now to FIG. 4, the smart card router 33 and the contact smart card 34 are shown in more detail. The smart card router 33 includes a card access module and router 33a coupled to the terminal interface 32 (via the operating system, not shown, of the mobile terminal), coupled to the contact smart card 34 via a card reader chip 33d, and coupled to the ticketing system 31 via a modulator/demodulator 33b and an RF antenna 33c. For interfacing with the ticketing system 31, the RF antenna 33c sends and receives over the air interface communication traffic, indicated as RF in air in FIG. 3, that is in essence a series of APDUs modulating an RF carrier according to ISO standard 14443. The RF antenna (which includes associated circuitry, not shown expressly, for amplifying and filtering the RF signals being communicated over the air interface) sends to and receives from the modulator/demodulator 33b guided RF signals, essentially the same RF signals as sent and received over the air interface, but communicated via a wireline, i.e. an RF waveguide. The modulator/demodulator 33b sends to the card access module 33a $R_{in}$ signals, which are APDUs it extracts from incoming RF signals (guided RF signals). The modulator/demodulator 33b receives from the card access module 33a $R_{out}$ signals, APDUs to be used to modulate an RF carrier and then to be transmitted to the ticketing system 31.

The card access module and router 33a communicates APDU signals to the different modules to which it is coupled, namely the terminal interface 32, the modulator/demodulator 33b (as already mentioned), and the card reader chip 33d. Any APDU arriving at the card access module and router 33a and intended for the terminal interface, no matter what its origin, is routed to the terminal interface as a $U_{in}$ signal (an APDU). Any APDU intended for the contact smart card 34 is routed to the card reader chip 33d as a $C_{in}$ signal (an APDU), which then provides it to the contact smart card 34 as an $S_{in}$ signal (an APDU) over the I/O connection to the contact interface 34a of the contact smart card. Any APDU intended for the RF antenna 33b is routed to the modulator/demodulator as an $R_{out}$ signal (an APDU), which then provides it to the RF antenna as guide RF. Signals arriving at the card access module and router 33a include $U_{out}$ signals (APDUs) from the user interface 32, $C_{out}$ signals (APDUs) from the card reader chip 33d (and so ultimately from the contact smart card 34 as $S_{out}$ signals), and $R_{in}$ signals (APDUs) already mentioned. The router function is performed by the card access module and router 33a inspecting each arriving APDU header, and discerning from the header the intended recipient. It is expected that new protocols will be developed accommodating routing so that for example the ticketing system will indicate over RF that messages to follow, or messages with certain protocol headers or IDs, are to go to destination specified by the ticketing system, such as to the terminal interface (for delivery to the user interface) or to the smart card.

Thus, with the router functionality of the smart card router 33 as described above, the mobile terminal 30 can be used to purchase a ticket from the ticketing system 31 (having the contactless card reader 35) in essentially the same way as a contactless smart card would be used, but, in addition, a user of the mobile terminal can query the contact smart card 33 included in the mobile terminal to determine the amount of funds (possibly in the form of tokens). If the smart card allows purchase of additional tokens as part of the same application used to buy tickets, then the user can add to the account balance by either using the terminal interface 32 to interface with the ticketing system 34 selling the tickets, if the ticketing system allows such a transaction (the new funds then being provided to the smart card via signals from the ticketing system 31 to the smart card 34 via the card access module and router 33a), or by communicating with a ticketing system controller (not shown) via a radio access network (not shown) and then downloading commands for incrementing the account balance on the smart card 34, the commands arriving at the card access module and router 33a via the terminal interface 32 and then being routed to the contact smart card 34.

Figure 5:
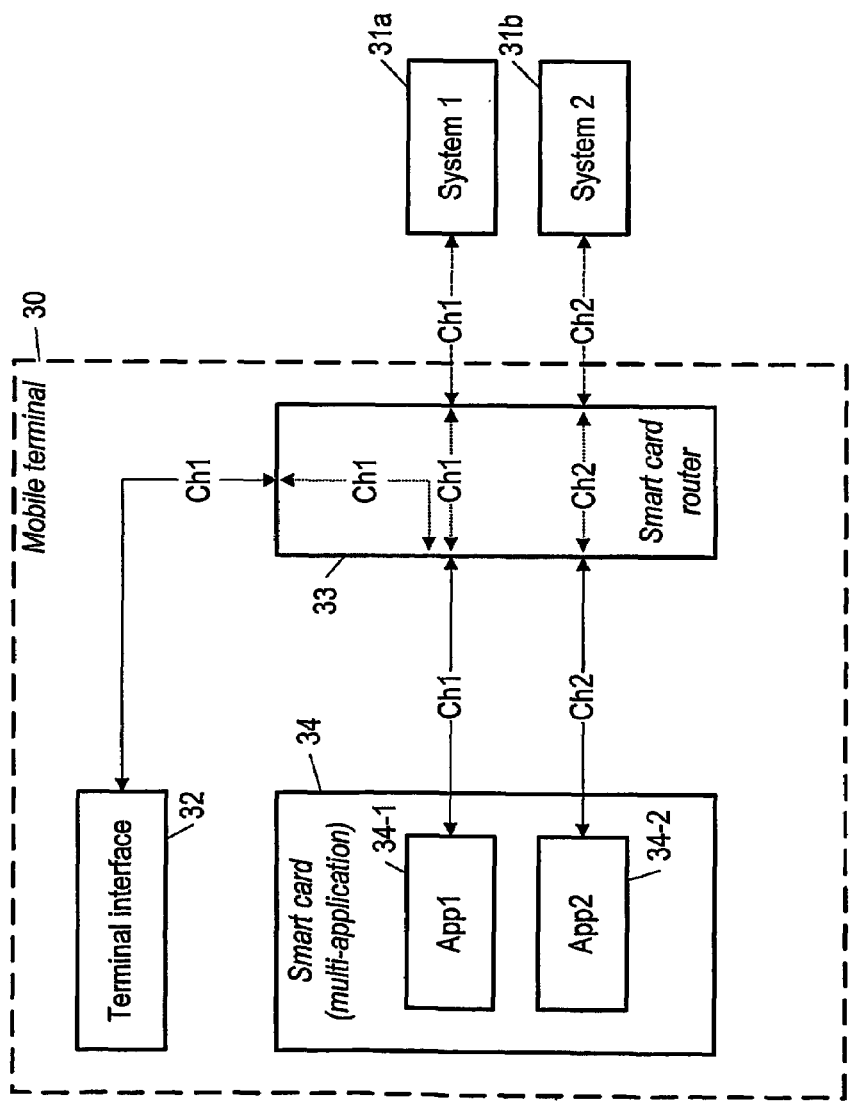
FIG. 5 is a block diagram of a mobile terminal hosting a smart card and having a terminal interface to the smart card and using logical channels, according to the invention.

Referring now to FIG. 5, the invention is shown as a mobile terminal 30 adapted to include a multi-application contact smart card 34, having a first application 34-1, such as for buying bus tickets, and a second application 34-2, such as for buying train tickets, and communicating with a system 1 and a system 2 respectively, over respective logical channels Ch1 and Ch2, and also being accessed via a terminal interface 32 using logical channel Ch1 (so that the terminal interface is communicating with the first application 34-1 on the smart card). As in FIG. 3, the smart card is a contact smart card, and does not include a contactless interface; the smart card router 33 simulates a contactless interface. Just like the mobile terminal of FIGS. 3 and 4, the mobile terminal 30 of FIG. 5 can be used as if it were a contactless smart card (although it in fact includes only a contact smart card), and the smart card can be accessed both by one of the external systems 31a 31b and via the terminal interface 32 concurrently, but in addition, the smart card can also be accessed by the other of the external systems 31a 31b at the same time as it is being accessed via the terminal interface 32 and the other of the external systems 31a 31b. Whether for concurrent or single access, the smart card router 33 provides logical channels to the different applications 34-1 34-2 on the smart card 34, and, ideally, does so in a way that is transparent to the card readers of the respective applications 34-1 34-2 (since the readers now assume that there is only one application in use on a smart card, and it would be preferable not to have to alter the readers to take into account that logical channels are being used to accommodate having more than one application on a smart card). In embodiments where only a single contact interface is used for multiple applications, additional applications can be downloaded to the smart card and the smart card router 33 can be configured to provide further logical channels. Logical channels are created separately, as needed, by the smart card, so for example the card may have one application running and then the wireless terminal (i.e., more specifically, the smart card router) receives a communication for another application and asks the card for a logical channel for use for communication with the other application; the card then responds with a logical channel identifier for communication with the other application. A channel identifier for each APDU is indicated in the header of the APDU, and it the card uses the channel identifier so indicated to direct the APDU to the correct application. In case a user of the wireless terminal wishes to interface with one of the applications (or simply the memory of one of the applications), the user indicates which application and the smart card router uses the logical channel assigned to the application to deliver communication traffic from the user (i.e. the user interface of the wireless terminal) to the indicated application. In case the user, via the user interface, wishes to communicate with one or another of the external systems 31a 31b (e.g. a bus ticketing system), the user so indicates via the user interface and the smart card router directs communications to the indicated system (and creates a logical channel for such communication, as needed).

The invention can be implemented with much of the current technology unchanged. Existing contactless card readers in ticketing systems (or in other kinds of systems that communicate with smart card applications) do not need to be changed to work with a multi-application smart card in a mobile terminal according to the invention, and the applications can even be put on the SIM card of the wireless terminal. The SIM application itself (providing the subscriber identification to the radio access network) is always on, but with the invention, and in particular because of its use of logical channels, RF communications with a contactless card reader are provided without making any changes to the system hosting the contactless card reader. Specifications for accessing multi-application cards and for selecting, using, installing new and deleting applications on the cards are now defined and complete, and are established in the marketplace.

Figure 6:
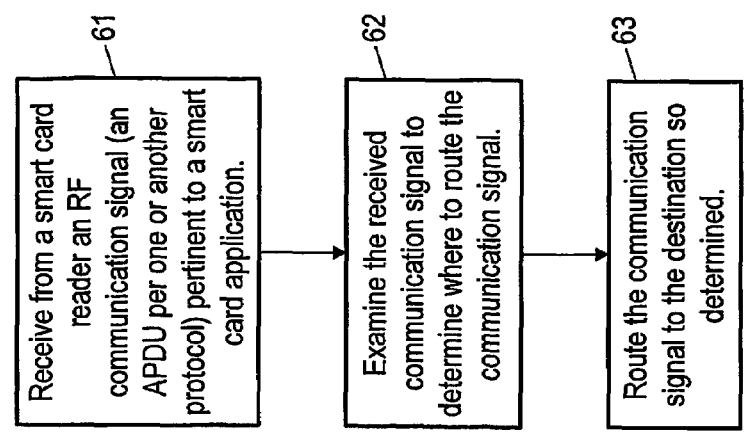
FIG. 6 is a flowchart of the method of communication between a wireless terminal and a smart card reader, according to the invention.

Referring now to FIG. 6, the routing process of the smart card router 33, and more particularly of the card access module and router 33a, is shown as including a first step 61 of receiving a communication signal concerning a smart card application, a communication signal which is typically an APDU per one or another protocol, followed by a next step 62 of examining the received communication signal to determine where to route it (either to the terminal interface 31, or to the smart card 34, or to one or another of a particular application 34-1 34-2 on a multi-application smart card 34, or to the contactless card reader 35 of an application system facility 31a 31b), and preferably examining the header of each APDU, followed by a step 63 of routing the communication signal to the destination so determined.

As the communication to a smart card is directed to only one interface according to the invention, namely the contact interface, the smart card, a standard contact smart card, is simpler and cheaper than the smart card in a mobile terminal according to the prior art, i.e. a dual-interface card with the antenna moved off-card. RF communication requirements are such that smart cards are restricted to small memories and low processing power, but a smart card in a mobile terminal according to the invention does not, by itself, communicate via RF, and so can have a larger memory and more processing power, even though RF access to the card is the same as in the prior art as far as a ticketing system is concerned (i.e. the fact that the RF communication is provided by off-card modules is transparent to the ticketing system).

With a mobile terminal having a terminal interface (including a user interface) and adapted to include a contact smart card according to the invention, the card operating system does not need to be changed to allow for concurrent access by a ticketing system (for example) and the terminal interface, since, as shown in FIG. 3, all access is routed through the contact interface (the only on-card interface) of the card. Thus, with the invention, a user is able to browse the content of the card memory while the card is being used to purchase a ticket using the standard operating system of the standard contact smart card.

Since with the invention a contactless interface is simulated (by the smart card router 33) off-card (including the power for the RF communications), enough resources of the smart card are freed to make it suitable for use as a multi-application smart card, containing different applications, possibly from different companies, and for providing the security required for each application (which requires substantial processing resources).

The invention requires that a mobile terminal be adapted by providing additional hardware and software. The antenna loop used in simulating a contactless interface requires additional hardware, as in current RF smart cards, or it may use terminal DSP (digital signal processing) resources to do the modulation (e.g. the modulation for GSM or other modulation) making the additional hardware cost smaller. Logical channel usage to access the smart card from mobile terminal applications is most naturally provided using software, as is user interface support.

Smart card APDU command software is already present in mobile terminals (to provide SIM usage), and it can be used, possibly with modifications, further reducing the costs.

In respect to reporting communication parameters to a contactless card reader mentioned above, a mobile terminal adapted according to the invention to include a contact smart card, appears to the outside world to provide a contactless smart card. When a contactless smart card is first presented to a card reader (i.e. when it is "swiped" before a contactless card reader), it communication parameters to the reader. With the invention, the parameter reporting is done by the mobile terminal, not the smart card. The smart card cannot itself report RF communication parameters, because it is a normal contact smart card. The mobile terminal reports its communication parameters according to its internal RF implementation. Since application command usage is not dependent on the communication parameters, it is possible to "fake" the communication parameters on behalf of the card to make the RF communications possible (i.e. to provide communication parameters for a standard contactless smart card and so appear to the contactless card reader as a standard contactless card, even though the terminal is doing the RF communication, not a standard contactless smart card). At the start of communications with a contactless card reader 35 (FIG. 3), the wireless terminal 30 reports the RF communication parameters in a message in a format understandable to the contactless smart card reader 35 and so enables communication with the card reader. The RF parameters so reported are possibly for proprietary capabilities of the smart card 34, and in the preferred embodiment are derived from data provided over the input/output line (see FIG. 3) of the smart card 34 in an answer-to-reset message issued by the smart card 34 (in answer to a reset signal).

The invention also comprehends embodiments in which the smart card application resides not on the smart card but in terminal memory (usually only for low-security applications) or inside the terminal microprocessor (for high-security applications), which has security features. Increasingly computing devices, such as PDAs and mobile terminals, are equipped with security components and ASICs (application specific integrated circuits) for encrypted and secured communications and for security sensitive applications running on the device microprocessor. In order to utilize these components also for radio-communication based transactions, such as ticketing as described above, the devices need to be enhanced with wireless communication capability compatible with existing smart card based systems. These security components are often an integral part of the terminal microprocessor, and thus need a separate RF-communication capability.

Along this same line, the invention also comprehends routing messages to the SIM smart card or to a secondary smart card (i.e. a card separate from the SIM smart card) or to terminal memory or to the terminal microprocessor to support multiple locations for applications.

The RF antenna 33c (FIG. 3) and RF modulation/demodulation module 33b need not be integral with the wireless terminal, but can be provided as a terminal accessory or provided as part of an existing accessory (such as the phone cover which is a suitable place for the RF antenna 33c). The accessory can then route communication for a smart card application to the card access module and router 33a for routing to the smart card application, wherever it is located.

SCOPE OF THE INVENTION

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A smart card router module, for use as a component of a mobile cellular terminal including a cellular telephone functionality for communication via a cellular communication network and having a terminal interface and a smart card application host, wherein the smart card router module is responsive to a radiofrequency communication signal issuing from a contactless smart card reader, for demodulating the radiofrequency communication signal and providing either a demodulated communication traffic signal routed to the smart card application host or a demodulated communication traffic signal routed to the terminal interface, the smart card router module determining the routing based on information conveyed by the radiofrequency communication signal.

2. A mobile cellular terminal, comprising a smart card router module as in claim 1, further comprising the smart card application host, wherein the smart card application host is selected from the group consisting of a contact smart card, a microcontroller residing in the mobile cellular terminal, and a security component of the mobile cellular terminal.

3. A smart card router module as in claim 1, wherein the smart card router module is also responsive to unmodulated communication traffic ($S_{out}$) provided by the smart card application host and is responsive to unmodulated communication traffic provided by the terminal interface, and in response to either provides a modulated communication traffic signal for transmission to the contactless smart card reader.

4. A smart card router module as in claim 3, wherein the smart card router module comprises a card access module and router, a modulator/demodulator, radiofrequency antenna, and a card reader chip, wherein the card access module and router is coupled to the smart card application host via the card reader chip and is coupled to the terminal interface and is also coupled to the radiofrequency antenna the modulator/demodulator, the radiofrequency antenna in turn being radiatively coupled to the contactless smart card reader.

5. A smart card router module as in claim 1, wherein the smart card router module is configured to provide logical channels for communication with different applications hosted by the smart card application host.

6. A mobile cellular terminal comprising a smart card router module as in claim 1, wherein the mobile cellular terminal is configured to report radiofrequency parameter messages in a format understandable to the contactless smart card reader so as to enable communications with the contactless smart card reader.

7. A mobile cellular terminal as in claim 6, wherein the radiofrequency parameters so reported indicate proprietary capabilities of the smart card application host.

8. A mobile cellular terminal as in claim 6, wherein the radiofrequency parameters are derived from data provided by an answer-to-reset message issued by the smart card application host.

9. A method for use by a smart card router module in a mobile cellular terminal, the mobile cellular terminal including cellular telephone functionality, the method for use in communicating with a contactless smart card reader, the mobile cellular terminal including a smart card application host hosting at least one smart card application, the method comprising:

the smart card router module receiving from the contactless smart card reader a radiofrequency communication signal pertinent to the at least one smart card application;

the smart card router module examining the radiofrequency communication signal so as to determine where to route the radiofrequency communication signal including possibly routing the communication signal to the at least one smart card application or to a terminal interface of the mobile cellular terminal or to a radiofrequency antenna for radiative transmission to a system related to the at least one smart card application; and routing the communication signal to the destination so determined.

10. A method as in claim 9, wherein the smart card application host is selected from the group consisting of a contact smart card, a microcontroller residing in the mobile cellular terminal, and a security component of the mobile cellular terminal.

11. A method as in claim 9, wherein in routing the communication signal, logical channels are used for communication with different applications hosted by the smart card application host.

12. A method as in claim 9, further comprising reporting radiofrequency parameter messages in a format understandable to the contactless smart card reader so as to enable the communications when starting communications with the contactless smart card reader.

13. A method as in claim 12, wherein the radiofrequency parameters so reported indicate proprietary capabilities of the smart card application host.

14. A method as in claim 12, wherein the radiofrequency parameters are derived from data provided by an answer-to-reset message issued by the smart card application host.

15. A computer program product comprising a computer readable storage structure embodying computer program code thereon for execution by a computer processor hosted by a mobile cellular terminal, wherein said computer program code comprises instructions for performing a method including:

receiving from a contactless smart card reader a radiofrequency communication signal pertinent to at least one smart card application hosted by the mobile cellular terminal;

examining the received communication signal so as to determine where to route the received communication signal, including possibly routing the communication signal to the at least one smart card application or to a terminal interface of the mobile cellular terminal or to a radiofrequency antenna of the mobile cellular terminal for radiative transmission to a system related to the at least one smart card application; and routing the communication signal to the destination so determined.

* * * * *

UNITED STATES PATENT AND TRADEMARK OFFICE
CERTIFICATE OF CORRECTION

| | |
|---|---|
| PATENT NO. | : 7,299,983 B2 |
| APPLICATION NO. | : 10/528258 |
| DATED | : July 1, 2003 |
| INVENTOR(S) | : Lauri Piikivi |

It is certified that error appears in the above-identified patent and that said Letters Patent is hereby corrected as shown below:

1. In column 11, line 26, claim 4, line 3, before "radio frequency", --a-- should be inserted.

2. In column 11, line 30, claim 4, line 7, after "antenna", --via-- should be inserted.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,299,983 B2 |
| APPLICATION NO. | : 10/528258 |
| DATED | : November 27, 2007 |
| INVENTOR(S) | : Lauri Piikivi |

Page 1 of 1

It is certified that error appears in the above-identified patent and that said Letters Patent is hereby corrected as shown below:

1. In column 11, line 26, claim 4, line 3, before "radio frequency", --a-- should be inserted.

2. In column 11, line 30, claim 4, line 7, after "antenna", --via-- should be inserted.

This certificate supersedes the Certificate of Correction issued May 13, 2008.

Signed and Sealed this

Third Day of June, 2008

JON W. DUDAS
*Director of the United States Patent and Trademark Office*